(12) United States Patent
Lightner et al.

(10) Patent No.: US 9,317,565 B2
(45) Date of Patent: Apr. 19, 2016

(54) ALERTING SYSTEM BASED ON NEWLY DISAMBIGUATED FEATURES

(71) Applicant: QBASE, LLC, Reston, VA (US)

(72) Inventors: Scott Lightner, Leesburg, VA (US); Franz Weckesser, Spring Valley, OH (US)

(73) Assignee: QBase, LLC, Reston, VA (US)

( * ) Notice: Subject to any disclaimer, the term of this patent is extended or adjusted under 35 U.S.C. 154(b) by 0 days.

(21) Appl. No.: 14/558,179

(22) Filed: Dec. 2, 2014

(65) Prior Publication Data

US 2015/0154196 A1 Jun. 4, 2015

Related U.S. Application Data

(60) Provisional application No. 61/910,789, filed on Dec. 2, 2013.

(51) Int. Cl.
*G06F 7/00* (2006.01)
*G06F 17/30* (2006.01)

(52) U.S. Cl.
CPC ...... *G06F 17/3053* (2013.01); *G06F 17/30598* (2013.01)

(58) Field of Classification Search
None
See application file for complete search history.

(56) References Cited

U.S. PATENT DOCUMENTS

| | | | |
|---|---|---|---|
| 6,128,660 A | 10/2000 | Grimm et al. | |
| 6,178,529 B1 | 1/2001 | Short et al. | |
| 6,266,781 B1 | 7/2001 | Chung et al. | |
| 6,353,926 B1 | 3/2002 | Parthesarathy et al. | |
| 6,457,026 B1 | 9/2002 | Graham et al. | |
| 6,460,036 B1 * | 10/2002 | Herz | 707/748 |
| 6,738,759 B1 | 5/2004 | Wheeler et al. | |
| 6,832,737 B2 | 12/2004 | Karlsson et al. | |
| 7,058,846 B1 | 6/2006 | Kelkar et al. | |
| 7,370,323 B2 | 5/2008 | Marinelli et al. | |
| 7,421,478 B1 | 9/2008 | Muchow | |
| 7,447,940 B2 | 11/2008 | Peddada | |
| 7,543,174 B1 | 6/2009 | van Rietschote et al. | |
| 7,593,940 B2 * | 9/2009 | Gruhl et al. | 1/1 |

(Continued)

FOREIGN PATENT DOCUMENTS

WO 2013/003770 1/2013

OTHER PUBLICATIONS

International Search Report and Written Opinion dated Mar. 3, 2015, corresponding to International Patent Application No. PCT/US2014/067921, 10 pages.

(Continued)

*Primary Examiner* — Jeffrey A Burke
(74) *Attorney, Agent, or Firm* — Eric L. Sophir; Dentons US LLP

(57) ABSTRACT

The present disclosure relates to a method of alerting users regarding newly disambiguated features. More specifically, a newly disambiguated feature may pass through different filters/restrictions, such as, the known knowledge base. The disclosed known knowledge base may filter the newly disambiguated feature, comparing the newly disambiguated features to the existing features to discover a new feature of interest. Particularly, the disclosed new feature of interest may include a new person, a new phone number, a new place, a new company, among others. Finally, if there is a new feature that did not match with the existing disambiguated features in the known knowledge base, then an alert may be emitted to a user.

18 Claims, 2 Drawing Sheets

(56) References Cited

U.S. PATENT DOCUMENTS

| | | | |
|---|---|---|---|
| 7,681,075 B2 | 3/2010 | Havemose et al. | |
| 7,818,615 B2 | 10/2010 | Krajewski, III et al. | |
| 7,899,871 B1 | 3/2011 | Kumar et al. | |
| 7,917,393 B2* | 3/2011 | Valdes et al. | 726/23 |
| 7,970,808 B2* | 6/2011 | Konig | G06F 17/2785 707/962 |
| 8,055,933 B2 | 11/2011 | Jaehde et al. | |
| 8,122,026 B1 | 2/2012 | Laroco, Jr. et al. | |
| 8,326,788 B2* | 12/2012 | Allen et al. | 706/47 |
| 8,332,258 B1 | 12/2012 | Shaw | |
| 8,341,622 B1 | 12/2012 | Eatough | |
| 8,345,998 B2 | 1/2013 | Malik et al. | |
| 8,356,036 B2 | 1/2013 | Bechtel et al. | |
| 8,375,073 B1 | 2/2013 | Jain | |
| 8,423,522 B2 | 4/2013 | Lang et al. | |
| 8,429,099 B1* | 4/2013 | Perkowitz et al. | 706/12 |
| 8,429,256 B2 | 4/2013 | Vidal et al. | |
| 8,726,267 B2 | 5/2014 | Li et al. | |
| 8,751,505 B2* | 6/2014 | Carmel et al. | 707/742 |
| 8,762,375 B2* | 6/2014 | Brdiczka et al. | 707/736 |
| 8,782,018 B2 | 7/2014 | Shim et al. | |
| 8,856,099 B1* | 10/2014 | Lasko et al. | 707/706 |
| 8,924,319 B1* | 12/2014 | Bearman | 706/17 |
| 8,995,717 B2 | 3/2015 | Cheng et al. | |
| 9,009,153 B2 | 4/2015 | Khan et al. | |
| 9,025,892 B1 | 5/2015 | Lightner et al. | |
| 9,032,387 B1 | 5/2015 | Hill et al. | |
| 2001/0037398 A1 | 11/2001 | Chao et al. | |
| 2002/0165847 A1 | 11/2002 | McCartney et al. | |
| 2002/0174138 A1 | 11/2002 | Nakamura et al. | |
| 2003/0028869 A1 | 2/2003 | Drake et al. | |
| 2003/0112792 A1 | 6/2003 | Cranor et al. | |
| 2003/0158839 A1 | 8/2003 | Faybishenko et al. | |
| 2003/0182282 A1 | 9/2003 | Ripley | |
| 2004/0027349 A1 | 2/2004 | Landau et al. | |
| 2004/0143571 A1 | 7/2004 | Bjornson et al. | |
| 2004/0153869 A1 | 8/2004 | Marinelli et al. | |
| 2004/0205064 A1 | 10/2004 | Zhou et al. | |
| 2004/0215755 A1 | 10/2004 | O'Neill | |
| 2005/0192994 A1 | 9/2005 | Caldwell et al. | |
| 2006/0101081 A1 | 5/2006 | Lin et al. | |
| 2006/0122978 A1* | 6/2006 | Brill et al. | 707/3 |
| 2006/0294071 A1 | 12/2006 | Weare et al. | |
| 2007/0005639 A1 | 1/2007 | Gaussier et al. | |
| 2007/0005654 A1* | 1/2007 | Schachar et al. | 707/104.1 |
| 2007/0073708 A1 | 3/2007 | Smith et al. | |
| 2007/0174167 A1* | 7/2007 | Natella et al. | 705/36 R |
| 2007/0203693 A1 | 8/2007 | Estes | |
| 2007/0203924 A1 | 8/2007 | Guha et al. | |
| 2007/0240152 A1 | 10/2007 | Li et al. | |
| 2007/0250519 A1 | 10/2007 | Fineberg et al. | |
| 2007/0282959 A1 | 12/2007 | Stern | |
| 2008/0010683 A1 | 1/2008 | Baddour et al. | |
| 2008/0027920 A1 | 1/2008 | Schipunov et al. | |
| 2009/0019013 A1 | 1/2009 | Tareen et al. | |
| 2009/0043792 A1 | 2/2009 | Barsness et al. | |
| 2009/0049038 A1 | 2/2009 | Gross | |
| 2009/0089626 A1 | 4/2009 | Gotch et al. | |
| 2009/0094484 A1 | 4/2009 | Son et al. | |
| 2009/0144609 A1 | 6/2009 | Liang et al. | |
| 2009/0216734 A1 | 8/2009 | Aghajanyan et al. | |
| 2009/0240682 A1 | 9/2009 | Balmin et al. | |
| 2009/0292660 A1 | 11/2009 | Behal et al. | |
| 2009/0299999 A1 | 12/2009 | Loui et al. | |
| 2009/0322756 A1 | 12/2009 | Robertson et al. | |
| 2010/0077001 A1 | 3/2010 | Vogel et al. | |
| 2010/0138931 A1 | 6/2010 | Thorley et al. | |
| 2010/0161566 A1* | 6/2010 | Adair et al. | 707/690 |
| 2010/0223264 A1 | 9/2010 | Bruckner et al. | |
| 2010/0235311 A1 | 9/2010 | Cao et al. | |
| 2010/0274785 A1 | 10/2010 | Procopiuc et al. | |
| 2011/0047167 A1* | 2/2011 | Caceres | 707/749 |
| 2011/0071975 A1 | 3/2011 | Friedlander et al. | |
| 2011/0093471 A1 | 4/2011 | Brockway et al. | |
| 2011/0119243 A1 | 5/2011 | Diamond et al. | |
| 2011/0125764 A1 | 5/2011 | Carmel et al. | |
| 2011/0282888 A1* | 11/2011 | Koperski et al. | 707/752 |
| 2011/0296397 A1 | 12/2011 | Vidal et al. | |
| 2012/0016875 A1* | 1/2012 | Jin et al. | 707/734 |
| 2012/0030220 A1 | 2/2012 | Edwards et al. | |
| 2012/0059839 A1 | 3/2012 | Andrade et al. | |
| 2012/0102121 A1 | 4/2012 | Wu et al. | |
| 2012/0117069 A1 | 5/2012 | Kawanishi et al. | |
| 2012/0131139 A1 | 5/2012 | Siripurapu et al. | |
| 2012/0246154 A1 | 9/2012 | Duan et al. | |
| 2012/0310934 A1 | 12/2012 | Peh et al. | |
| 2012/0323839 A1 | 12/2012 | Kiciman et al. | |
| 2013/0132405 A1 | 5/2013 | Bestgen et al. | |
| 2013/0166480 A1 | 6/2013 | Popescu et al. | |
| 2013/0166547 A1 | 6/2013 | Pasumarthi et al. | |
| 2013/0290232 A1 | 10/2013 | Tsytsarau et al. | |
| 2013/0303198 A1 | 11/2013 | Sadasivam et al. | |
| 2013/0325660 A1 | 12/2013 | Callaway | |
| 2013/0326325 A1 | 12/2013 | De et al. | |
| 2014/0013233 A1 | 1/2014 | Ahlberg et al. | |
| 2014/0022100 A1 | 1/2014 | Fallon et al. | |
| 2014/0089237 A1 | 3/2014 | Adibi | |
| 2014/0156634 A1 | 6/2014 | Buchmann et al. | |
| 2014/0244550 A1 | 8/2014 | Jin et al. | |
| 2014/0255003 A1 | 9/2014 | Abramson et al. | |
| 2014/0280183 A1 | 9/2014 | Brown et al. | |
| 2014/0351233 A1 | 11/2014 | Crupi et al. | |
| 2015/0074037 A1 | 3/2015 | Sarferaz | |
| 2015/0154079 A1 | 6/2015 | Lightner et al. | |
| 2015/0154264 A1 | 6/2015 | Lightner et al. | |
| 2015/0154297 A1 | 6/2015 | Lightner et al. | |

OTHER PUBLICATIONS

International Search Report and Written Opinion dated Mar. 6, 2015 corresponding to International Patent Application No. PCT/US2014/067993, 9 pages.

International Search Report and Written Opinion dated Mar. 10, 2015 corresponding to International Patent Application No. PCT/US2014/067999, 10 pages.

International Search Report and Written Opinion of the International Searching Authority dated Apr. 15, 2015 corresponding to International Patent Application No. PCT/US2014/068002, 10 pages.

International Search Report and Written Opinion dated Feb. 24, 2015 corresponding to International Patent Application No. PCT/US2014/0067918, 10 pages.

Tunkelang, D. "Faceted Search," Morgan & Claypool Publ., 2009, pp. i-79.

Schuth, A., et al., "University of Amsterdam Data Centric Ad Hoc Faceted Search Runs," ISLA, 2012, pp. 155-160.

Tools, Search Query Suggestions using ElasticSearch via Shingle Filter and Facets, Nov. 2012, pp. 1-12.

Wang, et al., "Automatic Online News Issue Construction in Web Environment," WWW 2008/Refereed Track: Search—Applications, Apr. 21-25, 2008—Beijing, China, pp. 457-466.

Blei et al., "Latent Dirichlet Allocation" Journal of Machine Learning Research 3 (2003), pp. 993-1022.

Chuang et al., "A Practical Web-based Approach to Generating Topic Hierarchy for Text Segments," CIKM '04, Nov. 8-13, 2004, Washington, DC, USA, Copyright 2004 ACM 1-58113-874-0/04/0011, pp. 127-136.

International Search Report and Written Opinion of the International Searching Authority dated Apr. 15, 2015, corresponding to International Patent Application No. PCT/2014/067994, 9 pages.

Vizard, The Rise of In-Memory Databases, Jul. 13, 2012.

* cited by examiner

ALERTING SYSTEM BASED ON NEWLY DISAMBIGUATED FEATURES

CROSS-REFERENCE TO RELATED APPLICATIONS

This application claims the benefit of U.S. Provisional Application No. 61/910,789, entitled "Alerting System Based On Newly Disambiguated Features," filed on Dec. 2, 2013, which is incorporated herein by reference in its entirety.

This application is related to U.S. patent application Ser. No. 14/558,254, entitled "DESIGN AND IMPLEMENTATION OF CLUSTERED IN-MEMORY DATABASE," filed Dec. 2, 2014; U.S. patent application Ser. No. 14/558,121, entitled "METHOD FOR ENTITY-DRIVEN ALERTS BASED ON DISAMBIGUATED FEATURES," filed Dec. 2, 2014; and U.S. patent application Ser. No. 14/558,300, entitled "EVENT DETECTION THROUGH TEXT ANALYSIS USING TRAINED EVENT TEMPLATE MODELS," filed Dec. 2, 2014; each of which are hereby incorporated by reference in their entirety.

FIELD OF THE DISCLOSURE

The present disclosure relates in general to databases, and more particularly, to a method for feature-driven alerts based on disambiguated features.

BACKGROUND

The internet provides several sources of information which may be exploited. Internet news feeds and websites that allow users to interact with one another have exploded in popularity in the last few years. News feed channels such as CNN, social networking websites, such as Facebook or LinkedIn, and micro-blogging websites such as Twitter enjoy widespread use. Millions of users post messages, images, and videos on such websites on a daily, even hourly basis. Often, information gathered from these sources may refer to events taking place in real time.

Currently, there are personalized notification services that instantly may inform users about a new information matched with respect to a knowledge base and which may be related to an entity of interest. Said new information considered important and relevant may be notified via email, instant message, pager, or cell phone. The matching between the new information (where entities may be extracted and disambiguated) and the knowledge base may be based on a keywords alerts resource.

However, the conventional approach in the art related to alerts or notifications based on keywords may be problematic because references to named entities may be ambiguous and may result in many alerts that may not be on topic. Therefore, users may not want to get alerted on every entity of a given name, but just for new entities of the same name.

For the aforementioned reasons, there is a need for an improved method that allows users to be alerted regarding new knowledge of a disambiguated feature.

SUMMARY

An aspect of the present disclosure is a system and method for alerting user(s) of a newly disambiguated feature. More specifically, the disclosed feature could be a new feature with a new name or person, a new place, a new company, or a new instance of an entity based on an existing name. According to an embodiment, the feature disambiguation documents may be accurately determined to be associated with the feature of potential interest (for instance, discover a new person with the same name of an existing person in the knowledge base database or it can be discover a new organization with, same domain and associated entities, of an existing organization in the knowledge base database).

Another aspect of the present disclosure may be an alerting system based on a newly disambiguated feature which may be discovered according to a predetermined feature of interest. Specifically, the system may alert a user(s) about a newly disambiguated feature that was never before disambiguated.

Subsequently, the system may alert to users about when a newly feature is disambiguated. According to various embodiments, a feature of interest may include a person, a phone number, a place, a company name, among others.

According to another embodiment, the alerts may be emitted regarding to newly disambiguated feature coming from new documents, the types of alert the user may select from may include alerts by e-mail, phone number, or other type of feature to which the system may reach the user. The disambiguated features may be sent to an alert database (AD).

According to various embodiments, the AD may have a user identifier to which the alerts may be going to be sent; a collection of disambiguated features from which the user may select which feature he wants to monitor; an alert specification describing the type of alert the user wants to receive; and a known-knowledge base database in which known knowledge about the feature of interest may be stored. Any suitable methods may be employed for the user to communicate to the system regarding the feature of interest.

Particularly, the newly disambiguated feature may pass through different filters/restrictions, such as known knowledge base, where the disclosed known knowledge may filter the new information or new features by associating and/or matching the new features with an existing feature in the known knowledge base database.

By using entity disambiguation for the alert systems, documents may be accurately determined to be associated with the entity of interest, allowing the systems to alert users when new information about a feature is available, but only when it is about the correct feature of interest; i.e. the disclosed method eliminates alerts on documents that mention a different feature with the same name.

According to various embodiments, method for entity-driven alerts based on disambiguated features may reduce the number of false positives resulting from a state of the art search queries. This in turn, may increase the efficiency of monitoring, allowing for a broadened universe of alerts.

In one embodiment, a method comprises disambiguating, by a disambiguation computer, a document feature from an electronic document by way of: extracting, via a feature extraction computer, the document feature from the electronic document, and linking, by the linking computer, the extracted document feature, to a set of document features having a primary document feature and a secondary document feature stored in a knowledge database of document features of a plurality of electronic documents, the secondary document feature including a proximity cluster of co-occurring features in the plurality of electronic documents; adding, by an in-memory database computer, the disambiguated document feature to the knowledge database of co-occurring document features when the disambiguated document feature matches a document feature of interest in an alert database based at least in part on the linked set of document features including the proximity cluster; and generating an electronic user alert regarding the matching.

In another embodiment, a system comprises a disambiguation computer configured to disambiguate a document feature from an electronic document by being further configured to extract the document feature from the electronic document, and link the extracted document feature to a set of document features having a primary document feature and a secondary document feature stored in a knowledge database of document features of a plurality of electronic documents, the secondary document feature including a proximity cluster of co-occurring features in the plurality of electronic documents; and an in-memory database computer configured to add the disambiguated document feature to the knowledge database of co-occurring document features when the disambiguated document feature matches a document feature of interest in an alert database based at least in part on the linked set of document features including the proximity cluster, wherein the in-memory database computer is further configured to generate an electronic user alert regarding the matching.

In yet another embodiment, a non-transitory computer readable medium having stored thereon computer executable instructions to be executed by a processor comprises disambiguating, by a processor executing a disambiguation computer module, a document feature from an electronic document by way of: extracting, by the processor executing a feature extraction computer module, the document feature from the electronic document, and linking, by the processor executing a linking computer module, the extracted document feature to a set of document features having a primary document feature and a secondary document feature stored in a knowledge database of document features of a plurality of electronic documents, the secondary document feature including a proximity cluster of co-occurring features in the plurality of electronic documents; adding, by the processor executing an in-memory database computer module, the disambiguated document feature to the knowledge database of co-occurring document features when the disambiguated document feature matches a document feature of interest in an alert database based at least in part on the linked set of document features including the proximity cluster; and generating, by the processor, an electronic user alert regarding the matching.

Numerous other aspects, features of the present disclosure may be made apparent from the following detailed description.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
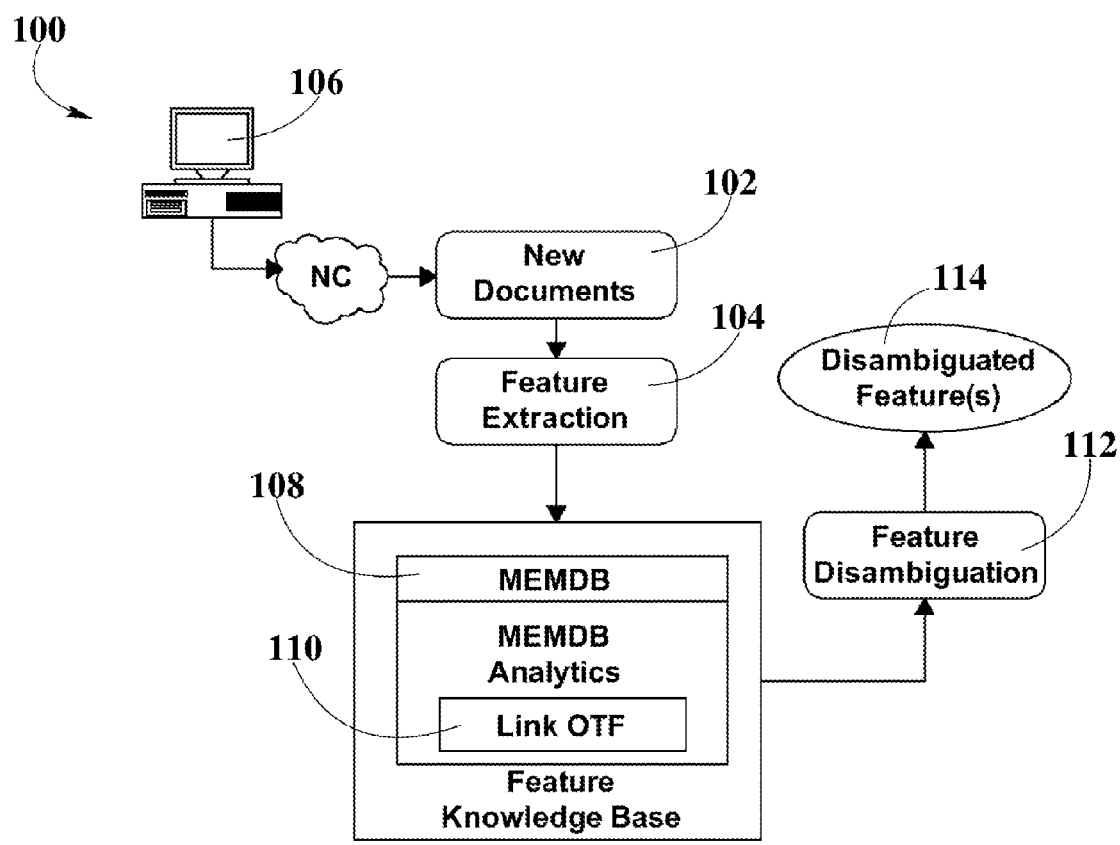
FIG. 1 is a block diagram for a system for disambiguating features, according to an exemplary embodiment.

As used herein, the following terms have the following definitions:

"Document" refers to a discrete electronic representation of information having a start and end.

"Knowledge Base" refers to a database containing features/entities.

"Feature extraction" refers to information processing methods for extracting information such as names, places, and organizations.

"Corpus" refers to a collection of one or more documents.

"Live corpus" or "Document Stream", refers to a corpus that is constantly fed as new documents are uploaded into a network.

"Link on-the-fly module" refers to any linking module that performs data linkage as data is requested from the system rather than as data is added to the system.

"Feature" refers to any information which is at least partially derived from a document.

"Feature attribute" refers to metadata associated with a feature; for example, location of a feature in a document, confidence score, among others.

"Event" refers to one or more features characterized by at least its occurrence in time.

"Module" refers to a computer or software components suitable for carrying out at least one or more tasks.

"Topic" refers to a set of thematic information which is at least partially derived from a corpus.

DETAILED DESCRIPTION

The present disclosure is here described in detail with reference to embodiments, which form a part here. Other embodiments may be used and/or other changes may be made without departing from the spirit or scope of the present disclosure. The illustrative embodiments described in the detailed description are not meant to be limiting of the subject matter presented here.

The present disclosure describes a system and method for alerting user to a newly disambiguated feature in one or more electronic documents.

The feature may be a new entity with a new name, a person, a phone number, a place, a company, or a new instance, among others, of a feature based on an existing name. By using entity disambiguation documents may be accurately determined to be associated with the entity of interest. This allows the system to alert users when a newly disambiguated feature is discovered.

According to various embodiments, disambiguated features, on which the present method for entity-driven alerts is based, may be disambiguated by any suitable methods. According to one embodiment, a system for disambiguating features may include multiple computer hardware and/or software modules, such as one or more feature extraction computer modules, one or more disambiguation computer modules, one or more scoring computer modules, and one or more linking computer modules. The disclosed system and method for disambiguating features may improve the accuracy of entity disambiguation beyond what may be achieved by considering no document linking Taking account of document linkage may allow better disambiguation by considering document and entity relationships implied by links.

An alert mechanism can be based on disambiguated features that a user can specify around an already existing and disambiguated feature of interest (can be any feature such as entities, topics, etc.) in the knowledge base. This differs from conventional alert systems that are based on keyword search alert mechanisms, wherein a "disambiguated feature" guides the alert, providing better relevance and precision. Also, the alert system described herein can provide user an ability to a build alert specification around the secondary features of already existing disambiguated features, towards getting alerted on the discovery of newly discovered disambiguated features having closely related secondary feature characteristics specified in the alert.

The alert mechanism can detect and communicate emerging new disambiguated features related to a feature of interest, new associations to the feature of interest, and new knowledge discovered to the feature of interest, besides just a group of documents that mention the feature of interest. The embodiments also describe a system-wide knowledge base update process by support of dynamic on-the-fly-linking mechanism in an in-memory database (MEMDB) based on an individual user's alert query. Thus, the embodiments can provide a framework to support collaborative knowledge sharing among different users in a given system establishment.

System for Disambiguating Features

FIG. 1 is a block diagram for a system 100 for disambiguating features, according to an embodiment. In the illustrated embodiment, a system 100 for disambiguating features may include a new document input module 102 for receiving input of new documents into an existing knowledge base. The feature extraction module 104 performs feature extraction from the inputted document. The disclosed new document input module 102 may be fed from a massive corpus or live corpus that, in turn, may be fed every second, such as the internet or network connection (NC).

Particularly, one or more feature recognition and extraction algorithms may be employed by the feature extraction module 104 to analyze new document(s) input via the module 102. A score may be assigned to each extracted feature. The score may indicate the level of certainty of the feature being correctly extracted with the correct attributes. Additionally, during feature extraction by the module 104, one or more primary features may be identified from new document input. Each primary feature may have been associated with a set of feature attributes and one or more secondary features (like proximity cluster of co-occurring features, such as entities, co-occurring topics, co-occurring events and facts).

During the process of disambiguation, a plurality of sources (internet based sources or live corpus of documents) may be constantly getting new knowledge, updated by users 106, that is not pre-linked in some static way; thus, the number of documents to be evaluated may be infinitely increasing. This may be achieved because of the use of MEMDB 108. In one embodiment, after feature disambiguation of the new document is performed, the extracted new features may be included in the MEMDB 108 to pass through a link on-the-fly (OTF) module 110; where the features may be compared and linked, and a feature ID of disambiguated feature may be returned to the user as a result from a query. In addition to the feature ID, the resulting feature cluster defining the disambiguated feature may optionally be returned. The link OTF module 110 may be capable of constantly evaluating, scoring, linking, and clustering a feed of information.

MEMDB 108 can be a database storing data in records controlled by a database management system (DBMS) (not shown) configured to store data records in a device's main memory, as opposed to conventional databases and DBMS modules that store data in "disk" memory. Conventional disk storage requires processors (CPUs) to execute read and write commands to a device's hard disk, thus requiring CPUs to execute instructions to locate (i.e., seek) and retrieve the memory location for the data, before performing some type of operation with the data at that memory location. In-memory database systems access data that is placed into main memory, and then addressed accordingly, thereby mitigating the number of instructions performed by the CPUs and eliminating the seek time associated with CPUs seeking data on hard disk.

In-memory databases may be implemented in a distributed computing architecture, which may be a computing system comprising one or more nodes configured to aggregate the nodes' respective resources (e.g., memory, disks, processors). As disclosed herein, embodiments of a computing system hosting an in-memory database may distribute and store data records of the database among one or more nodes. In some embodiments, these nodes are formed into "clusters" of nodes. In some embodiments, these clusters of nodes store portions, or "collections," of database information.

Various methods for linking the features may be employed, which, in embodiments, may essentially use a weighted model for determining which feature types are most important, which have more weight, and, based on confidence scores, determine the degree of confidence that feature extraction by the module 104 and feature disambiguation by the disambiguation module 112 were performed with respect to the correct feature(s). Consequently, the correct feature(s) may go into the resulting cluster of features. As more nodes are working in parallel, the process may be more efficient. The result of the aforementioned processing by the above computer modules may be one or more newly disambiguated features 114.

The newly disambiguated feature 114 may be compared with the existing knowledge base database in order to determine the relationship between features and determine if there is a match between the new features and the previously extracted features. In various embodiments, the matching process mentioned here can vary from simple conceptual distance measure to sophisticated graph clustering approaches based on the dimensions of the involved secondary features that aid in discovering newly disambiguated features.

Once features are disambiguated the number of alerts to be sent to a user 106 may be reduced by letting the user 106 specify alert restrictions.

The disclosed newly disambiguated features 114 may then be included in an Alert Database (AD). The AD may have at least the following components.

TABLE 1

Alert database.

| User ID | Feature of Interest | Alert Specifications | Known-Knowledge Base |
| --- | --- | --- | --- |

According to various embodiments, the AD may have a user identifier to which the alerts may be going to be sent; a collection of disambiguated features from which the user may select which feature he wants to monitor; an alert specification describing the type of alert the user wants to receive; and a known-knowledge base database in which known knowledge about the feature of interest may be stored. Any suitable methods may be employed for the user to communicate to the system which is the feature of interest.

According to various embodiments, a feature of interest may include a person, a phone number, a place, a company name, among others.

The types of alert the user may select from may include alerts by e-mail, phone number, or another communication medium by which the system may reach the user.

According to one embodiment, known-knowledge base database may be stored in another MEMDB. Known-knowledge base database may have any suitable structure, which may be processed by one or more suitable algorithms. Such algorithms include associated topics, proximity cluster of other features (such as entities or events, among others), derived prominence factor (e.g., based on simple frequency counts or a weighted association with global events and importance automatically captured via a large time bound corpus), and temporally linked events, among others. Additionally, known-knowledge base may include restrictions from which the alerts may be going to be based, according to the user specifications. Informational knowledge within known-knowledge base database may have any suitable representation, such as incremental graphs, among others.

Method for Alerting Users Based on Newly Disambiguated Features

Figure 2:
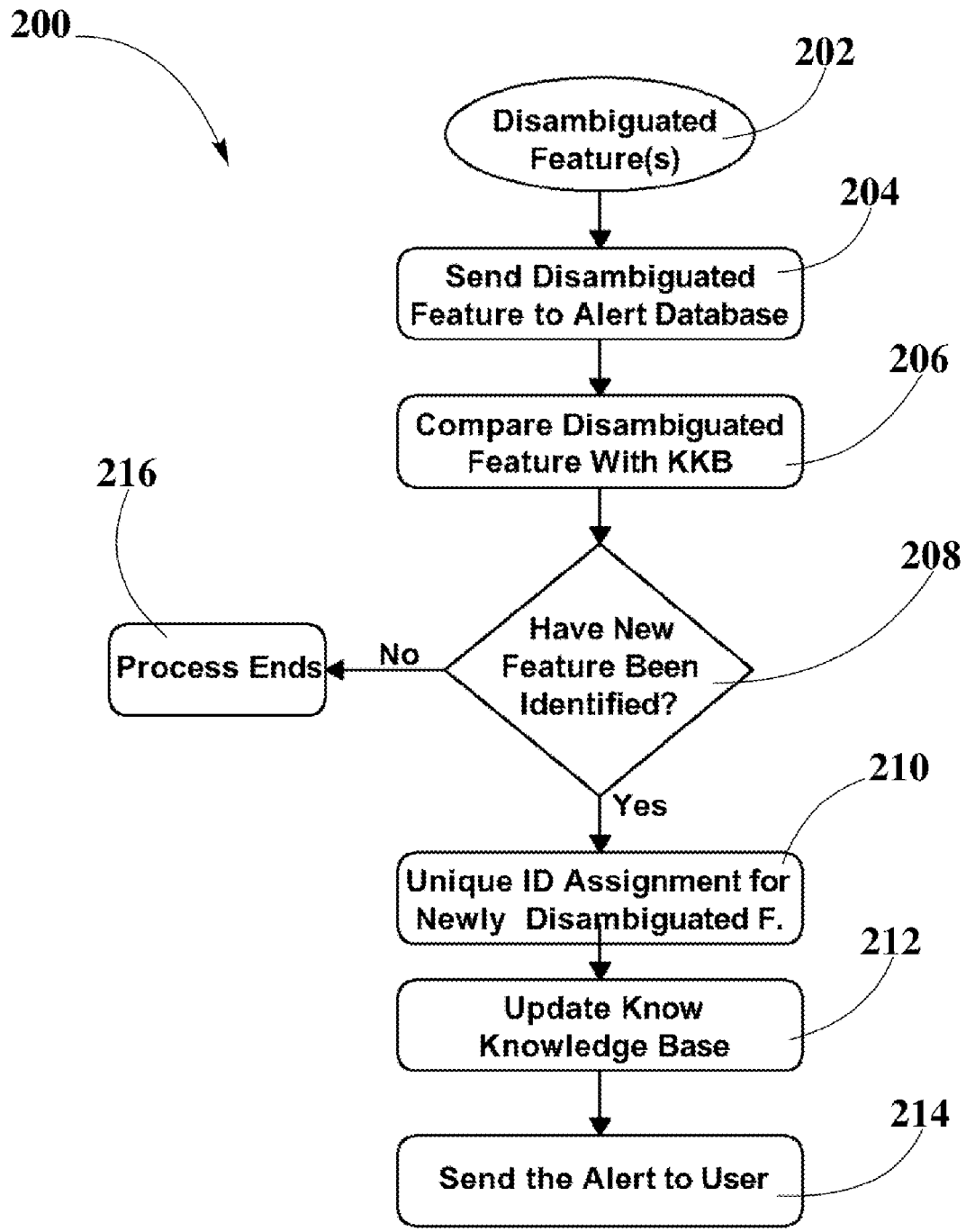
FIG. 2 is a flowchart diagram for an alerting method, according to an exemplary embodiment.

FIG. 2 is a flowchart diagram of an alerting method 200 to be performed by the system described herein, according to an embodiment. More specifically, in an embodiment of the alerting method 200, a user may previously indicate a feature or event of interest, and, therefore, in step 202, different newly disambiguated features may be associated with the existing features in the known knowledge base. Particularly, the disclosed newly disambiguated feature may include a person, a phone number, a place, a company, among others, which may be related to an existing feature of interest in the knowledge base.

In step 204, the disclosed newly disambiguated document feature (coming from a network connection-NC) is sent to the alert database to be accurately compared, in step 206, with the existing knowledge included within the known knowledge base. Afterwards, in step 208, alerting method 200 may detect whether a new feature has been identified during the knowledge identification process, where the new feature may be based on newly disambiguated feature 202.

If, in step 210, the alerting method 200 identifies a new feature according to known knowledge base, then a unique identification (ID) is assigned to the newly disambiguated feature 202, and the ID is associated with the cluster of defining features and stored within the knowledge base of the MEMDB. Additionally, in step 212, the disclosed new information (i.e., the newly disambiguated feature 202) may be updated within knowledge base. Subsequently, in step 214, the alerting method 200 may send the alert to user by e-mail, phone number, or other type of communication medium.

However, if the knowledge identification 208 does not identify or associate a new feature with an existing feature in the known knowledge base, then the process may end, step 216.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    disambiguating, by a disambiguation computer, a document feature from an electronic document by way of:
    extracting, via a feature extraction computer, the document feature from the electronic document, and
    linking, by a linking computer, on-the-fly, as data is requested by a user computer, the extracted document feature, to a set of document features having a primary document feature and a secondary document feature stored in a knowledge database of document features of a plurality of electronic documents, wherein the secondary document feature including a proximity cluster of co-occurring features in the plurality of electronic documents; and
    adding, by an in-memory database computer, the disambiguated document feature to the knowledge database of co-occurring document features when the disambiguated document feature matches a document feature of interest in an alert database based at least in part on the linked set of document features including the proximity cluster, wherein the in-memory database computer comprises a main memory storing an in-memory database that comprises the knowledge database; and
    generating, by a computer, an electronic user alert regarding the matching.

2. The method of claim 1 further comprising assigning to the disambiguated document feature, by a scoring computer, a confidence score indicative of a level of confidence associated with a degree of disambiguation of the document feature, wherein the disambiguated document feature further matches the document feature of interest in the alert database based at least in part on the confidence score.

3. The method of claim 1 wherein the in-memory database computer matches the disambiguated document feature with the document feature of interest in the alert database based on a distance parameter associated with the proximity cluster.

4. The method of claim 1 wherein the in-memory database computer matches the disambiguated document feature with the document feature of interest in the alert database based on graph clustering of the secondary feature.

5. The method of claim 1 wherein the disambiguated document feature is selected from the group consisting of a person, a phone number, a location, and a company name.

6. The method of claim 1 wherein the extracted document feature and the set of document features are linked temporarily.

7. A system comprising:
    a disambiguation computer configured to disambiguate a document feature from an electronic document by being further configured to extract the document feature from the electronic document, and link, on-the-fly, as data is requested by a user computer, the extracted document feature to a set of document features having a primary document feature and a secondary document feature stored in a knowledge database of document features of a plurality of electronic documents, the secondary document feature including a proximity cluster of co-occurring features in the plurality of electronic documents; and
    an in-memory database computer configured to add the disambiguated document feature to the knowledge database of co-occurring document features when the disambiguated document feature matches a document feature of interest in an alert database based at least in part on the linked set of document features including the proximity cluster, wherein the in-memory database computer comprises a main memory storing an in-memory database that comprises the knowledge database, wherein the in-memory database computer is further configured to generate an electronic user alert regarding the matching.

8. The system of claim 7 further comprising a scoring computer configured to assign to the disambiguated document feature a confidence score indicative of a level of confidence associated with a degree of disambiguation of the document feature, wherein the disambiguated document feature further matches the document feature of interest in the alert database based at least in part on the confidence score.

9. The system of claim 7 wherein the in-memory database computer is configured to match the disambiguated document feature with the document feature of interest in the alert database based on a distance parameter associated with the proximity cluster.

10. The system of claim 7 wherein the in-memory database computer is configured to match the disambiguated document feature with the document feature of interest in the alert database based on graph clustering of the secondary feature.

11. The system of claim 7 wherein the disambiguated document feature is selected from the group consisting of a person, a phone number, a location, and a company name.

12. The system of claim 7 wherein the extracted document feature and the set of document features are linked temporarily.

13. A non-transitory computer readable medium having stored thereon computer executable instructions to be executed by a processor comprising:
    disambiguating, by a processor executing a disambiguation computer module, a document feature from an electronic document by way of:
    extracting, by the processor executing a feature extraction computer module, the document feature from the electronic document, and
    linking, by the processor executing a linking computer module, on-the-fly, as data is requested by a user computer, the extracted document feature to a set of document features having a primary document feature and a secondary document feature stored in a knowledge database of document features of a plurality of electronic documents, the secondary document feature including a proximity cluster of co-occurring features in the plurality of electronic documents;
    adding, by the processor executing an in-memory database computer module, the disambiguated document feature to the knowledge database of co-occurring document features when the disambiguated document feature matches a document feature of interest in an alert database based at least in part on the linked set of document features including the proximity cluster, wherein the in-memory database computer module is executed on a computer that comprises a main memory storing an in-memory database, wherein the in-memory database comprises the knowledge database; and generating, by the processor, an electronic user alert regarding the matching.

14. The computer readable medium of claim 13 wherein the instructions further comprise assigning to the disambiguated document feature, by the processor executing a scoring computer module, a confidence score indicative of a level of confidence associated with a degree of disambiguation of the document feature, wherein the disambiguated document feature further matches the document feature of interest in the alert database based at least in part on the confidence score.

15. The computer readable medium of claim 13 wherein the instructions further comprise matching, by the processor executing the in-memory database computer module, the disambiguated document feature with the document feature of interest in the alert database based on a distance parameter associated with the proximity cluster.

16. The computer readable medium of claim 13 wherein the instructions further comprise matching, by the processor executing the in-memory database computer module, the disambiguated document feature with the document feature of interest in the alert database based on graph clustering of the secondary feature.

17. The computer readable medium of claim 13 wherein the disambiguated document feature is selected from the group consisting of a person, a phone number, a location, and a company name.

18. The computer readable medium of claim 13 wherein the extracted document feature and the set of document features are linked temporarily.

* * * * *